US011323402B2

(12) United States Patent
Mao et al.

(10) Patent No.: US 11,323,402 B2
(45) Date of Patent: *May 3, 2022

(54) SPATIAL TOPIC REPRESENTATION OF MESSAGES

(71) Applicant: International Business Machines Corporation, Armonk, NY (US)

(72) Inventors: Xiao Xia Mao, Shanghai (CN); Xin Feng, Shanghai (CN); Ya Qing Chen, Shanghai (CN); Wei Jun Zheng, Shanghai (CN); Zhen Hong Ding, Shanghai (CN); Chuan Le Zheng, Shanghai (CN); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,386

(22) Filed: Oct. 27, 2017

(65) Prior Publication Data
US 2018/0375812 A1  Dec. 27, 2018

Related U.S. Application Data

(63) Continuation of application No. 15/632,541, filed on Jun. 26, 2017.

(51) Int. Cl.
*G06Q 50/00* (2012.01)
*G06F 3/048* (2013.01)
(Continued)

(52) U.S. Cl.
CPC .............. *H04L 51/20* (2013.01); *G06F 3/048* (2013.01); *G06F 16/358* (2019.01); *G06F 40/169* (2020.01); *G06Q 50/01* (2013.01)

(58) Field of Classification Search
CPC ....... H04L 51/20; G06Q 50/01; G06F 17/241; G06F 3/048
(Continued)

(56) References Cited

U.S. PATENT DOCUMENTS 9,489,657 B2   11/2016   Chudge et al.
9,973,462 B1 *  5/2018   Petersen .................. H04L 51/14
(Continued)

FOREIGN PATENT DOCUMENTS

CN   102932454 A   2/2013
CN   103490989 A   1/2014
(Continued)

OTHER PUBLICATIONS

N. Kukimoto, Y. Onoue, K. Aoki, K. Fujita and K. Koyamada, "HyperInfo: Interactive Large Display for Informal Visual Communication", [online], 2014 [retrieved on Feb. 10, 2022], Retrieved from the Internet:https://ieeexplore.ieee.org/stamp/stamp.jsp?tp=&arnumber=7023983, pp. 399-404 (Year: 2014).*
(Continued)

*Primary Examiner* — Lynda Jasmin
*Assistant Examiner* — Ehrin L Pratt
(74) *Attorney, Agent, or Firm* — Stephen R. Yoder; Isaac J. Gooshaw

(57) ABSTRACT

A method, computer program product and computer system to generate a spatial visualization of topics contained in messages data is provided. A processor retrieves message data associated with a user. A processor determines one or more topics represented by the message data. A processor generates a spatial visualization of one or more user interface elements, where the spatial visualization includes a size and a location for the one or more user interface elements. A processor displays one or more user interface elements corresponding to the one or more topics.

4 Claims, 6 Drawing Sheets

(51) Int. Cl.
*H04L 51/222* (2022.01)
*G06F 16/35* (2019.01)
*G06F 40/169* (2020.01)

(58) Field of Classification Search
USPC .......................................................... 705/319
See application file for complete search history.

(56) References Cited

U.S. PATENT DOCUMENTS

| | | | |
|---|---|---|---|
| 2005/0226511 A1* | 10/2005 | Short | G06K 9/6253 |
| | | | 382/225 |
| 2007/0255791 A1 | 11/2007 | Bodlaender et al. | |
| 2010/0162138 A1 | 6/2010 | Pascal et al. | |
| 2012/0272160 A1* | 10/2012 | Spivack | G06Q 10/10 |
| | | | 715/752 |
| 2013/0152001 A1* | 6/2013 | Lovitt | H04M 1/72448 |
| | | | 715/765 |
| 2014/0025734 A1* | 1/2014 | Griffin | G06Q 50/01 |
| | | | 709/204 |
| 2014/0040387 A1* | 2/2014 | Spivack | G06F 16/24578 |
| | | | 709/206 |
| 2015/0193684 A1 | 7/2015 | Li et al. | |
| 2016/0171764 A1* | 6/2016 | Chew | G06T 11/206 |
| | | | 345/423 |
| 2016/0301645 A1 | 10/2016 | Shan et al. | |
| 2016/0364368 A1 | 12/2016 | Chen et al. | |
| 2017/0032021 A1 | 2/2017 | Watanachote | |
| 2017/0228445 A1* | 8/2017 | Chiu | G06F 16/248 |
| 2017/0235739 A1* | 8/2017 | Yang | G06F 3/0481 |
| | | | 715/784 |
| 2018/0356964 A1* | 12/2018 | Morris | G06F 3/167 |
| 2019/0121907 A1* | 4/2019 | Brunn | G06F 16/353 |

FOREIGN PATENT DOCUMENTS

| | | |
|---|---|---|
| KR | 1020160061250 A | 5/2016 |
| WO | 2015126851 A1 | 8/2015 |

OTHER PUBLICATIONS

Bhatia et al., "Summarizing Online Forum Discussions—Can Dialog Acts of Individual Messages Help?", Proceedings of the 2014 Conference on Empirical Methods in Natural Language Processing (EMNLP), pp. 2127-2131, Oct. 25-29, 2014, Doha, Qatar, © 2014 Association for Computational Linguistics.

Dong et al., "Structural Analysis of Chat Messages for Topic Detection", Preprint submitted to Online Information Review, May 2, 2006, pp. 1-33.

Mao et al., "Spatial Topic Representation of Messages", U.S. Appl. No. 15/632,541, pp. 1-28.

Hinchcliffe et al., "Exploring IBM's vision for enterprise collaboration", Zdnet, Jun. 13, 2016, 19 pages,<https://www.zdnet.com/article/exploring-ibms-vision-for-enterprise-collaboration/>.

IBM Appendix P., "List of IBM Patents or Patent Applications to be Treated as Related", Dated Oct. 27, 2017, 2 pages.

* cited by examiner

SPATIAL TOPIC REPRESENTATION OF MESSAGES

BACKGROUND OF THE INVENTION

The present invention relates generally to the field of messaging applications, and more particularly to presenting data indicative of messages to a user in a spatial manner.

Early messaging applications included instant messaging applications such as Internet Relay Chat (IRC), where users joined a "chat room" or channel and sent messages to other users that joined the channel. Later, peer-to-peer messaging applications became popular where users sent messages directly to one another. Today, social network platforms serve as a primary form of delivering messages to others. In some instances, social network messages are similar to the previous chat rooms where messages where broadcast to a group of users. In other instance, social network messages are similar to peer-to-peer messages by way of direct messages (DMs). In all the above, messages are presented in a timeline or temporal manner.

SUMMARY

Embodiments of the present invention provide a method, system, and program product to generate a spatial visualization of topics contained in messages data. A processor retrieves message data associated with a user. A processor determines one or more topics represented by the message data. A processor generates a spatial visualization of one or more user interface elements, where the spatial visualization includes a size and a location for the one or more user interface elements. A processor displays one or more user interface elements corresponding to the one or more topics.

DETAILED DESCRIPTION

Figure 1:
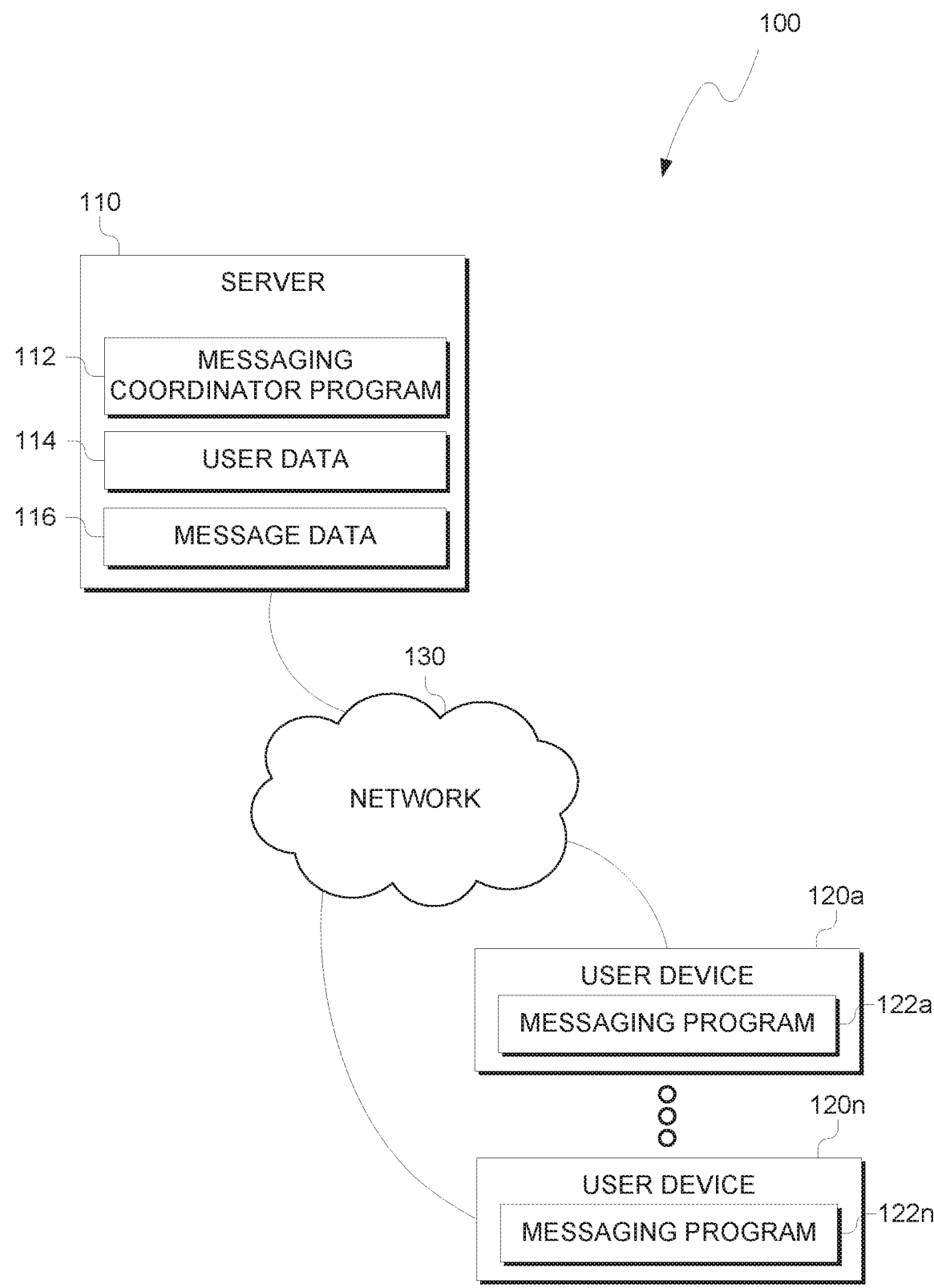
FIG. 1 is a functional block diagram illustrating a networked environment, in accordance with an exemplary embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked environment, generally designated 100, in accordance with one embodiment of the present invention. Networked environment 100 includes server 110 and client devices 120a-n connected over network 130. Server 110 includes messaging coordinator program 110, user data 114 and message data 116. User devices 120a-n include a respective messaging programs 122a-n.

In various embodiments of the present invention, server 110 and user devices 120a-n are each a computing device that can be a standalone device, a server, a laptop computer, a tablet computer, a netbook computer, a personal computer (PC), or a desktop computer. In another embodiment, server 110 and user devices 120a-n each, or as a whole, represent a computing system utilizing clustered computers and components to act as a single pool of seamless resources. In general, server 110 and user devices 120a-n can be any computing device or a combination of devices with access to user data 114 and message data 116 and is capable of executing messaging coordinator program 112 or messaging programs 122a-n. Server 110 and user devices 120a-n may each include internal and external hardware components, as depicted and described in further detail with respect to FIG. 5.

In this exemplary embodiment, messaging coordinator program 112, user data 114 and message data 116 stored on server 110. Additionally, messaging programs 122a-n are stored on a respective device of user devices 120a-n. However, in other embodiments, messaging coordinator program 112, user data 114 and message data 116, and messaging programs 122a-n may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between server 110 and user devices 120a-n, in accordance with a desired embodiment of the present invention.

In various embodiments, server 110 provides messaging services for a platform such as, but limited to, a social network, instant messaging applications, chat rooms, web-based forums, or any other platform that allows users to send messages, privately or publicly. Messaging coordinator program 112 receives and sends messages from users to the intended recipients of said messages. Users, via user devices 120a-n, provide messaging information (e.g., the contents of the messages and any recipients) to the respective messaging programs 122a-n. Messaging programs 122a-n send the messaging information to messaging coordinator program 112. In response, messaging coordinator program 112 sends the messages in the intended recipients. In various embodiments, user devices 120a-n each include a display device communicatively coupled to a processing device executing respective messaging programs 122a-n. In some embodiments, the display device is also touch sensitive to allow touch inputs or gestures. For example, a user device is a smartphone, tablet, or laptop with a touch enabled display device. In other embodiments, a user device an input device to interact with a messaging program, such as a mouse or other pointing device.

In various embodiments, users of messaging programs 112a-n login and access the messaging platform with identifying user information (e.g., username and password). Messaging coordinating program 112 authenticates the users with information stored in user data 114. Additionally, user data 114 includes information of other users (e.g., other users' usernames or appropriate contact information) associated with a user (e.g., friends, followers, following, etc.). In various embodiments, user data 114 also includes the preferences, likes or dislikes of a user. As discussed herein, messaging coordinating program 112 determines relevancy of various messages to a user based on the user's preferences, likes or dislikes of a user.

In various embodiments, messaging coordinating program 112 stores the messaging information in message data 116. Message data 116 includes the contents of the messages, the sender of the messages as well as any recipients. In some embodiments, messaging information does not include any direct recipients. For example, in an internet forum a message may be in reply to an ongoing thread of messages. In such embodiments and scenarios, messaging coordinating program 112 determines one or more intended recipients for the message. For example, for an internet forum reply, messaging coordinating program 112 determine intended recipients to include all participants (either on a current or ongoing basis) of the thread. As another example, messaging coordinating program 112 determines intended recipients based on any direct replies to other posts in the thread or mentions of other users in the contents of the message. In another scenario, messages may be posted publicly without any intended recipients (e.g., a social network post to a profile of the user). In such scenarios, messaging coordinating program 112 determines intended recipients to be followers of the user or any other users who may reply in the future, updating message data 116 accordingly.

In various embodiments, messaging coordinating program 112 determines the content of message data 116. Messaging coordinating program 112 applies natural language processing (NLP) to the unstructured text data of the posts and other messages stored as message data 116. Based on the NLP of message data 116, messaging coordinating program 112 determines one or more topics being discussed in each message. Based on the NLP processing of messages data 116, messaging coordinating program 112 associates the determined topics to each message that is analyzed by messaging coordinating program 112. In some embodiments, messaging coordinating program 112 includes context information regarding the analyzed messages when determine topics discussed. For example, messaging coordinating program 112 includes the heading or title of a message. As another example, the messaging platform includes one or more tags or other metadata descriptors to posted alongside the message. In such scenarios, messaging coordinating program 112 includes the tags or metadata descriptors in the analysis of the content of the messages in message data 116.

Figure 3A:
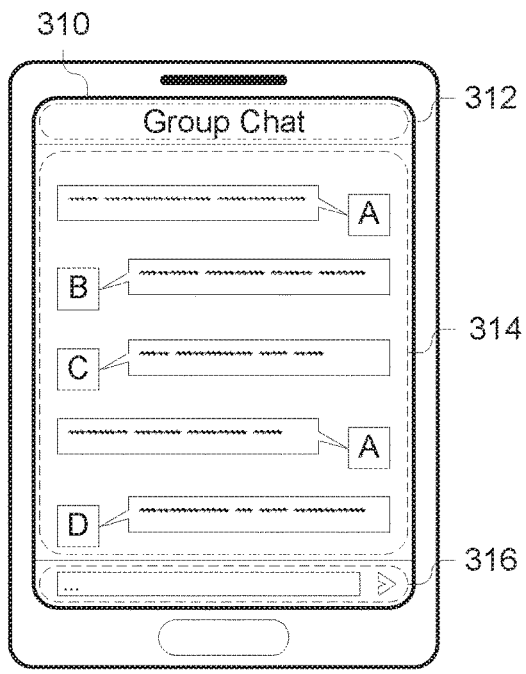
FIG. 3A illustrates an example temporal view of message data.

In various embodiments, messaging programs 122*a-n* provide users an interface to send and receive messages from other users. Additionally, messaging programs 122*a-n* provide an interface to see previously received messages. In one view, messaging programs 122*a-n* provide a temporal view of message data 116. Referring to FIG. 3A, messaging programs 122*a-n* provides a temporal view of previously received messages which includes interface 310 with view identifier 312, message log 314 and message input 316. View identifier 312 indicates that a group chat is being displayed by interface 310, with message log 314 displaying previously received messages from group chat participants (i.e., Users B, C, and D), as well as previously sent messages from the user (i.e., User A) to the group chat participants. Message input 316 provides an interface for the user to provide new messages to the group chat.

In FIG. 3A, interface 310 provides a temporal view of message data 116 associated with the user and any participants or recipients of the associated messages data with the user. Message log 314 displays messages in a temporal or time orientated manner. In this example illustration, recently received messages are displayed at the bottom of message log 314. However, as one of ordinary skill will appreciate, other orientations of temporal viewing of messages data 116 may be provided without deviating from the invention. For example, older messages may be displayed at the bottom of message log 314.

Figure 3B:
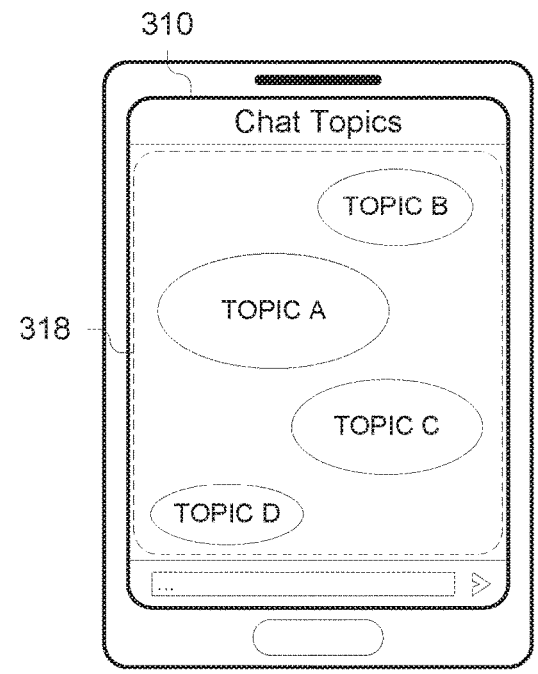
FIG. 3B illustrates an example spatial view of message data.

In various embodiments, messaging programs 122*a-n* provide an interface to see previously received messages. In another type of view, messaging programs 122*a-n* display a spatial view of messages data 116. Referring to FIG. 3B, an example topic list 318 is provided by interface 310. In spatial view 318, interface 310 provides one or more topics determined to be discussed in message data 116. As discussed herein, messaging coordinator program 112 determines the content of messages in message data 116. Based on this analysis, messaging coordinator program 112 identifies any topics being discussed and the messages of message data related to said topics.

Referring back to FIG. 3A, interface 310 provides a user message log 314 for viewing. Based on receiving a known type of user input or interaction, interface 310 switches to a spatial view of message data 116 (i.e., topic list 318). Upon receiving the input or interaction form the user, interface 310 display topics associated with message data 116 that was presented in the temporal view (i.e., the group chat history in messages log 314), where interface 310 switches to topic list 318 of FIG. 3B. In some embodiments, messaging programs 122*a-n* provide a spatial view of topics associated with a currently viewed message log or messages history of messages data 116. In other embodiments, messaging programs 122*a-n* provide a spatial view of topics associated with more than one subset of messages in message data 116. For example, messaging programs 122*a-n* provide a spatial view of topics associated with multiple group chats with different participants.

In various embodiments, messaging programs 122*a-n* provide interface elements or input recognition to identify when a user indicates to view a spatial view of topics for a particular subset of message data 116. For example, messaging programs 122*a-n* provide an interface element to switch between temporal and spatial views of message data 116. As another example, messaging programs 122*a-n* identifying any gesture or touch input provided by a user to switch between temporal and spatial views of message data 116.

In various embodiments, messaging coordinator program 112 determines a popularity score of messages in message data 116 based on the topics that the user is a participant. Based on the popularity score for the topics, messaging coordinator program 112 determines a size for display of the topics while in a spatial view when prompted by the user. Referring to FIG. 3B, topic list 318 includes four topics, Topic A, Topic B, Topic C and Topic D. Based on the selected temporal view when switching to the spatial view of one or more message logs, messaging coordinator program 112 identifies one or more topics are being discussed in the one or more message logs. Based on the number of participants and the number of messages associated with each topic, messaging coordinator program 112 determines a popularity score for the identified topics. Based on the determined score, messaging coordinator program 112 determines a relative size for each topic.

In various embodiments, messaging coordinator program 112 provides the popularity score for topics associated with currently viewed messages or a subset of message data 116 that a spatial view of topics is being requested for viewing by one or more messaging programs 122a-n. Messaging coordinator program 112 determines a percentage of the space to display a topic in topic list 318. In this type of scenario, messaging programs 122a-n translate the percentage size to a render size based on a screen size and resolution of a display device communicatively coupled to a computing device executing a messaging program of messaging programs 122a-n. Referring back to the example topic list 318 of FIG. 3B, Topic A has been determined to have a larger popularity score than Topic D. As such, interface 310 provided by a messaging program of messaging programs 122a-n renders the size of Topic A larger than that of Topic D.

In various embodiments, messaging coordinator program 112 determines a relevance score of messages in message data 116 based on one or more of the following (i) one or more preferences of a user as indicated in user data 114; (ii) participants (e.g., other users in a group chat) in message data 116 associated with a topic as well as the participation level of the participants; and (iii) a collaboration score associated with the previous participants and the user. For a given topic and a user's preferences for the topic, messaging coordinator program 112 determines a greater relevance score for topics that a user has a greater preference of viewing. For example, a user provides a list of preferences that are stored in user data 114 (e.g., a user prefers "sports" topics over "politics"). As another example, messaging coordinator program 112 applies a learning algorithm to messages data 116 and determines preferences of a user as they post and respond to previous messages. Additionally, messaging coordinator program 112 determines a relevance score based on participation of users for a given topic. Messaging coordinator program 112 determines the number of users discussing a particular topic and users that are not participating in said topic. For the larger ratio of users sending messages in relation to a topic, messaging coordinator program 112 determines a greater relevance score. Furthermore, messaging coordinator program 112 determines a collaboration score for the participants in each topic and a particular user. If the user and a first participant have previously engaged in discussion more than second participant and the same user, then messaging coordinator program 112 determines a greater collaboration score for the first participant. Based on a larger collaboration score, messaging coordinator program 112 determines that particular participants are of greater relevance to a user, thereby increasing the relevance score for topics that said participants discuss.

In various embodiments, messaging coordinator program 112 provides the relevance score for topics associated with a user to a requesting messaging program of messaging programs 122a-n that is displaying a spatial view of topics for the user. Based on the relevance score and a location of interaction, the messaging program determines a location to display the one or more topics within an interface of the messaging program. For example, a user performs a gesture with a touch enabled device to switch from a temporal view to a spatial view (e.g., message log 314 to topic list 318). Based on the location of the interaction and the relevance score for the topics, the messaging program renders each topic as a certain distance away from the interaction, with topics with a higher relevance score being rendered closer to the interaction than topics with a lower relevance score.

Figure 3C:
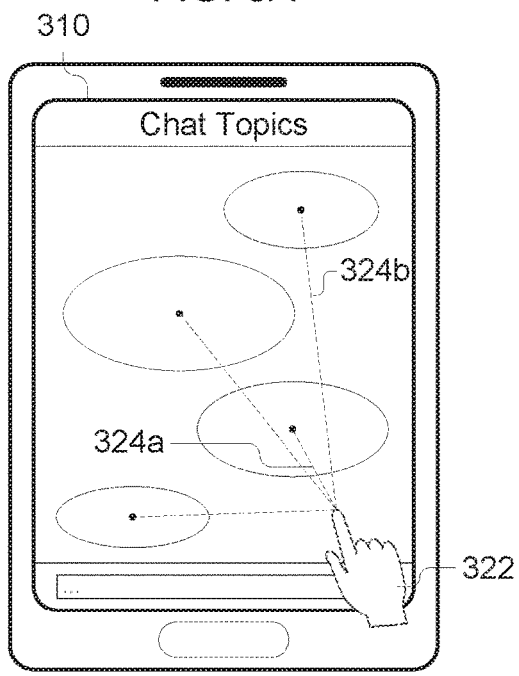
FIG. 3C illustrates an example display locations of topics in a spatial view.

Referring to FIG. 3C, interface 310 has received view interaction 322 from a user to display topic list 318. In this example, messaging coordinator program 112 determine a greater relevance score for Topic C than Topic B. As such, the messaging program providing interface 310 renders Topic C at a shorter distance from the view interaction 322 than topic B, as illustrated for Topic C distance 324a which is shorter than Topic B distance 324b. In some embodiments, interface 310 includes an icon or other interface element to switch to a spatial view. In such scenarios when a user interacts with the user interface element (e.g., uses a pointer device input to click a button in interface 310), the location of the interface element is equivalent to the location of view interaction 322 as in FIG. 3C. As such, the messaging program renders topics using the user interface element as the place of interaction in terms of distance.

In various embodiments and as discussed herein, messaging programs 122a-n provide users with message data 116 that the users have sent or received to other participants. Additionally, messaging programs 122a-n provide users with interfaces or interactions to switch between a temporal or timeline view of message data 116 as well as a spatial or topic view of message data 116. The spatial view displays topics discussed in message data. Messaging programs 122a-n change the size and location of the displayed topics based on the popularity and relevance of the topics to the user. As discussed herein, users can further interact with the spatial view of message data 116 to further refine the message data 116 that the user views or manages.

Figure 2:
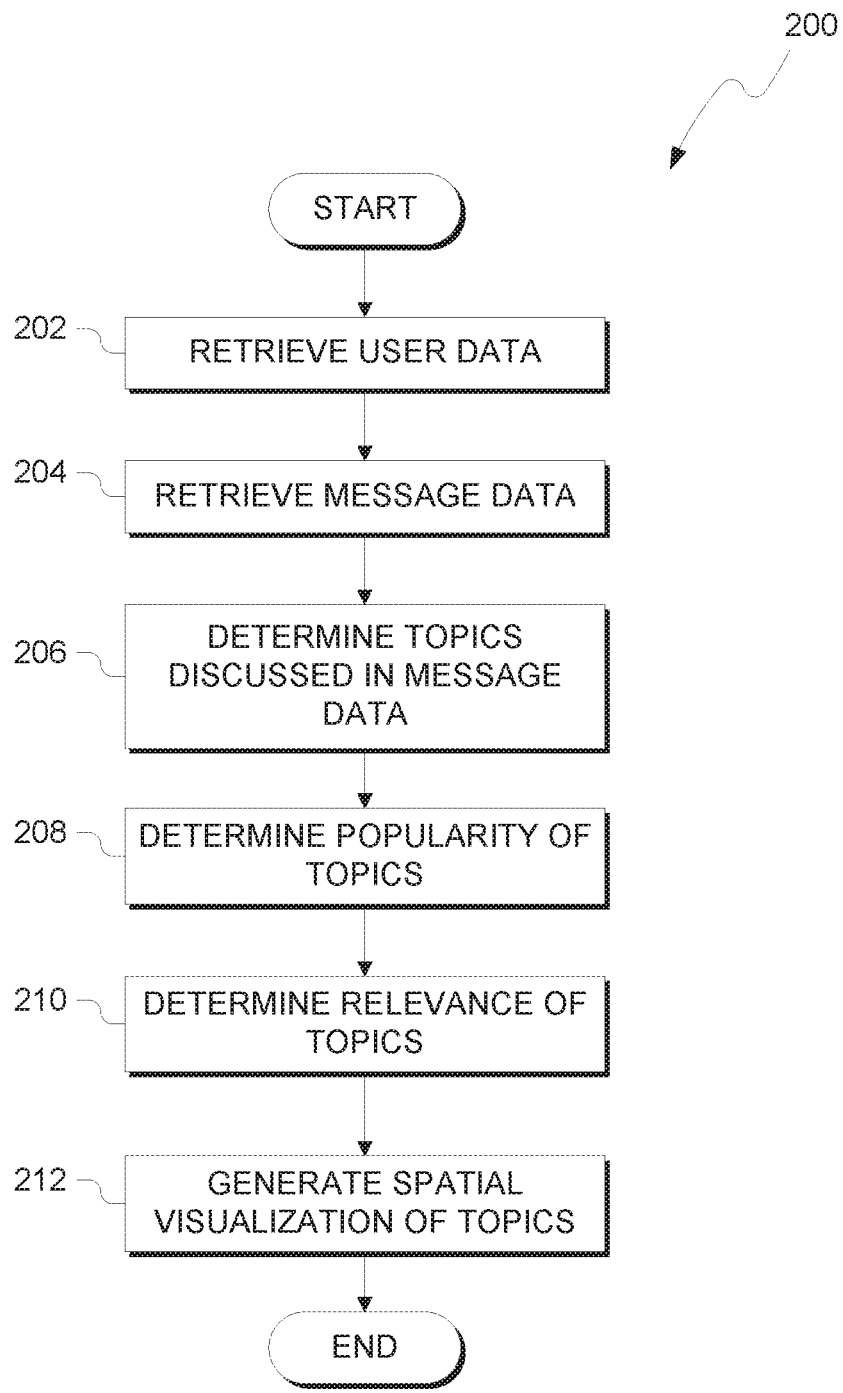
FIG. 2 illustrates operational processes of messaging coordinator program, on a computing device within the environment of FIG. 1, in accordance with an exemplary embodiment of the present invention.

FIG. 2 illustrates operational processes, generally designated 200, of messaging coordinator program 112. In process 202, messaging coordinator program 112 retrieves user data 116. Messaging coordinator program 112 identifies users and any indicated or determined preferences (e.g., topics or subjects the user prefers to discuss) of the users from user data 116. In process 204, messaging coordinator program 112 retrieves message data 116. Messaging coordinator program 112 identifies the content of each message (e.g., the unstructured text or body of a message) as well as any recipients or participants of each message.

In some embodiments, the operational processes of retrieving user data 114 and message data 116 are performed in an on-demand manner. For example, when a messaging program of messaging programs 122a-n requests a spatial view, then messaging coordinator program 112 performs the processes disclosed herein regarding FIG. 2 for message data 116 and user data 114 for which a spatial view is requested. In other embodiments, one or more processes disclosed herein regarding FIG. 2 are performed off-line or without being prompted by a messaging program. For example, messaging coordinator program 112 may determine content (e.g., process 206) of message data 116 prior to any demand from a messaging program of messaging programs 122a-n send any request. In some embodiments, one or more processes disclosed herein regarding FIG. 2 are performed by a messaging program of messaging programs 122a-n. For example, a messaging program receives topics associated with message data 116 and then determine popularity or relevance scores locally on the respective user device of user devices 120a-n. One of ordinary skill in the art will appreciate that either the operations of FIG. 2 or FIG. 4, as discussed herein, may be performed by either server 110, any device of user devices 120a-n, or any other device (not shown) connected to network 130.

In process 206, messaging coordinating program 112 determines one or more topics being discussed in message data 116. Messaging coordinating program 112 applies natural language processing (NLP) to the unstructured text data of the posts and other messages stored as message data 116. Based on the NLP of message data 116, messaging coordinating program 112 determines one or more topics being discussed in each message. Based on the NLP processing of messages data 116, messaging coordinating program 112 associates the determined topics to each message that is analyzed by messaging coordinating program 112. In some embodiments, messaging coordinating program 112 includes context information regarding the analyzed messages when determine topics discussed.

In process 208, messaging coordinating program 112 determines a popularity score for the topics discussed in message data 116. Based on the number of messages associated with a topic and the number of participants for the topic, messaging coordinating program 112 determines a popularity score for the topic. As more messages discuss a topic, messaging coordinating program 112 determines greater popularity score for the topic. Also, as more participants discuss a topic, messaging coordinating program 112 determines greater popularity score for the topic. In some embodiments, messaging coordinating program 112 determines a popularity score based on the following:

$$PS(T) = w_P * P + w_M * M \quad (E.1)$$

In E.1 above, PS(T) is the popularity score for a given topic, P is the number participants for the topic (e.g., the number of unique users discussing the topic), $w_P$ is a weight applied to the number of participants, M is the number of messages with content describing the topic, and $w_m$ is a weight applied to the number of messages. In some scenarios, weights $w_P$ and $w_m$ are applied to favor unique participants versus volume of messages. For example, a topic may have many messages, but only a few participants. By increasing $w_P$ and decreasing $w_m$, messaging coordinating program 112 can favor more unique participants as opposed to the number of messages.

In process 210, messaging coordinating program 112 determines a relevance score for the topics discussed in message data 116 regarding a particular user. For each topic, messaging coordinating program 112 determines the relevance score of the topic based on one or more preferences of a user, participants in message data 116 associated with a topic, and previous responses with the participants and the user. Messaging coordinating program 112 identifies the preferences of a user. In some embodiments, messaging coordinating program 112 receives preferences directly by the user, storing the input in user data 114. In other embodiments, messaging coordinating program 112 analyzes the message data 116 to determine the preferences of the user. In some embodiments, messaging coordinating program 112 determines a relevance score for a topic and a particular user based on the following:

$$RS(T,U) = Pref(T,U) * \Sigma^{P(T)} (C(P,U) * M_{P,T}/M_T) \quad (E.2)$$

In E.2 above, RS(T,U) is the relevance score for a topic T and user U. Pref(T,U) is a preference metric of the user for the topic. For example, Pref(T,U) is a weight applied across all topics associated with a user (e.g., 0.60 for music, 0.30 for movies, and 0.10 for literature). P(U) are all participants in the topic or all other users that have posted a message regarding the topic. For each participant, a collaboration score between the user and the participant is determined (i.e., C(P,U) where C is the collaboration and P is the participant and U is the user). Messaging coordinating program 112 determines the collaboration score is a distribution of previous responses and discussions a user previously had with other users (i.e., participants). For example, if User A has had made 100 messages with 75 directed to User B and 25 to User C, then C(B,A) is 0.75 and C(C,A) is 0.25. In some scenarios, messaging coordinating program 112 determines the collaboration score on a per topic basis (e.g., C(P,U,T)). Referring back to E.2, $M_{P,T}$ is the number of messages a participant P has made regarding the topic T. $M_T$ is the total number of messages made regarding the topic. Based on E.2 above, messaging coordinating program 112 determines how relevant a topic is for a particular user. As discussed herein, the popularity score and relevancy score for each topic indicate topic of interest to a user.

In various embodiments, messaging coordinating program 112 determines the popularity score and relevancy score for various topics based on message data 116 and the users and participants that sent or received said messages. In some embodiments, messaging coordinating program 112 varies the scope or amount of the topics, messages, users or participants when determining the popularity and relevancy scores for topics. For example, messaging coordinating program 112 determines a popularity score using all topics discussed in message data 116, regardless of users and any previous participation or collaboration. As another example, messaging coordinating program 112 only uses topics discussed by the user for which a spatial view is being requested (e.g., topics only discussed in messages sent by the user). As another example, messaging coordinating program 112 includes other messages from message data 116 in the determination of the popularity score and relevancy score for various topics. Such as including messages by friends or other contacts indicated in user data 114, even if the particular user never sent, received or viewed said message. On of ordinary skill in the art will appreciate that messaging coordinating program 112 may use any selection or subset or users and messages sent by said users when determining the popularity score and relevancy score for various topics without deviating from the invention.

In process 212, messaging coordinating program 112 generates a spatial visualization of the topics based on the determined popularity scores and relevancy scores of the topics. The spatial visualization displays a list of the determined topics in message data 116. The visualization includes user interface elements associated with each topic to be displayed on a user device of user devices 120a-n. In some embodiments and scenarios, a user requests a spatial view of message data 116 associated with the user (e.g., messages the user has sent or received). Messaging coordinating program 112 generates the spatial visualization by determining a location and size of the user interface elements. In some embodiments, messaging coordinating program 112 determines a relative location of the user interface elements based on the relevancy score of each topic, where interfaces for more relevant topics are placed closer to a location than interfaces for less relevant topics. In some embodiments, messaging coordinating program 112 determines a relative size for the interface elements based on the popularity score determined for each topic, where elements that are more popular being larger than elements with less popular topics. FIGS. 3B and 3C provide example illustrations of the spatial visualization as topic list 318, with each topic being of varying size and location.

In some embodiments, messaging coordinating program 112 generates a visualization with relative coordinates. Messaging coordinating program 112 sends the relative visualization to a messaging program to display to the user. In such embodiments, the messaging program translates the relative coordinates to positions on a display device based on the screen size and/or resolution of said display device. In other embodiments, messaging coordinating program 112 sends the determined popularity and relevancy score for topics in message data 116 to the messaging program. In such embodiments, the messaging program generates the visualization with absolute coordinates relative to the screen size and resolution of the device.

Figure 3D:
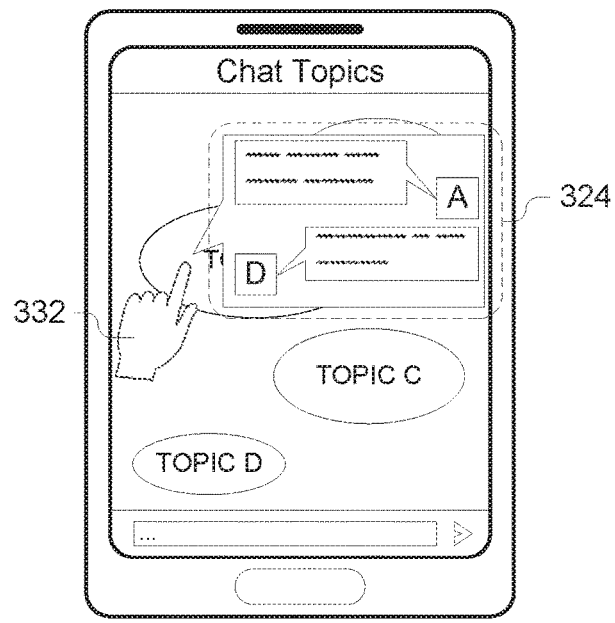
FIG. 3D illustrates an example display of messages related to a selected topic while in the spatial view.
Figure 3E:
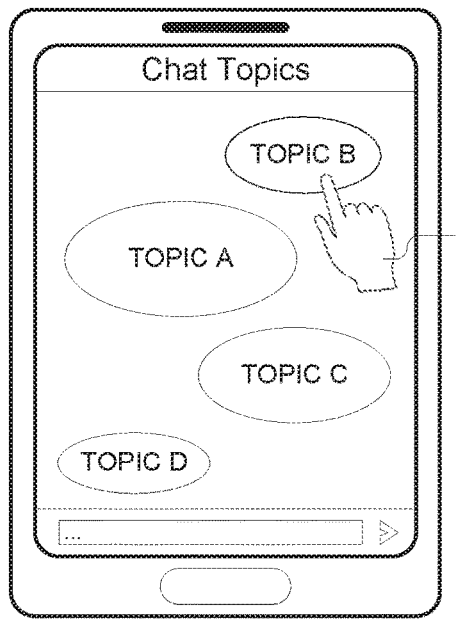
FIGS. 3E & 3F illustrate an example display of messages related to a selected topic while in the spatial view.
Figure 3F:
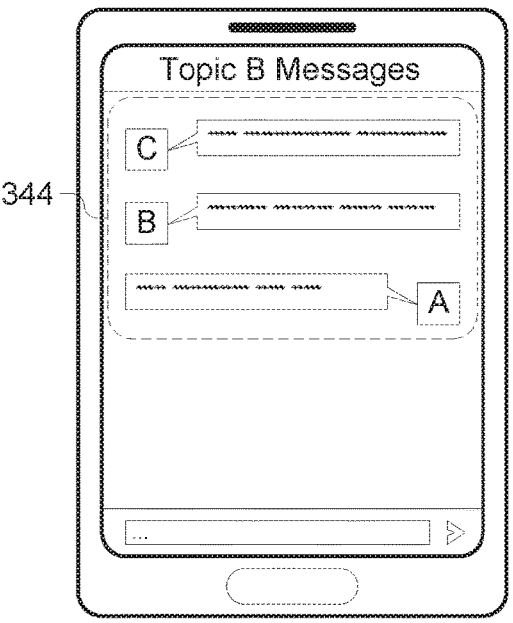

FIG. 3D illustrates an example display of messages related to a selected topic while in the spatial view. In some embodiments or scenarios, messaging programs 122a-n provide an interaction with the user interface elements representing topics being displayed in topic list 318. Upon receiving a user input, such as topic interaction 332, a messaging program displays topic popup 324. Topic popup 324 displays message data 116 associated with the selected topic from topic interaction 332 in a timeline manner similar to message log 314. However, topic popup 324 only includes messages associated with the selected topic. FIGS. 3E & 3F illustrate another example display of messages related to a selected topic while in the spatial view. Upon receiving a user input, such as topic interaction 342, a messaging program displays topic log 344. Topic popup 344 displays message data 116 associated with the selected topic from topic interaction 342 in a timeline manner similar to message log 314. In some embodiments, topic interaction 332 and topic interaction 342 are different gestures or types of inputs. For example, topic interaction 332 may be a short press and topic interaction 342 may be a long press.

Figure 3G:
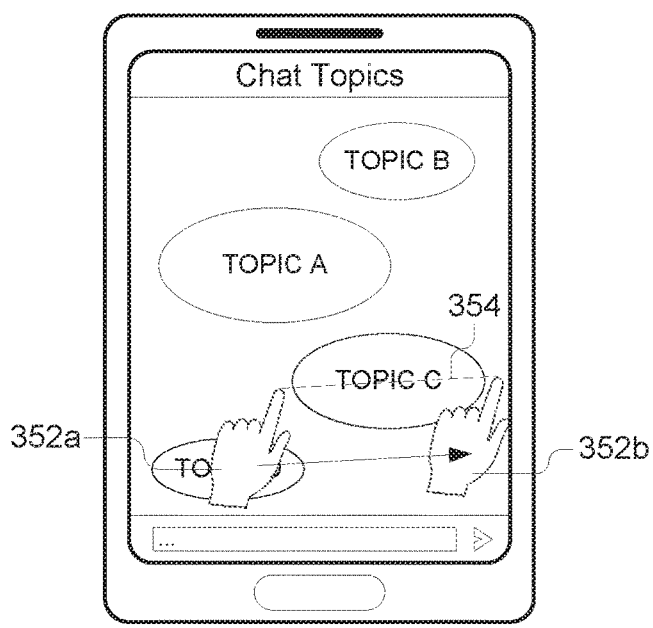
FIG. 3G illustrates an example gesture to remove messages related to a topic while in the spatial view.

FIG. 3G illustrates an example gesture to remove messages related to a topic while in the spatial view. In some embodiments or scenarios, messaging programs 122a-n provide an interaction with the user interface elements representing topics being displayed in topic list 318. Upon receiving a user input, such as topic interaction 332, a messaging program will dismiss or remove all messages in message data 116 associated with the topic. In FIG. 3G, a swipe interaction 354 is made across the topic, starting at interaction point 352a and ending at interaction point 352b. By providing such a type of interaction, a messaging program can allow users to quickly dismiss messages associated with certain topics without manually searching for and finding each message associated with the topic.

Figure 3H:
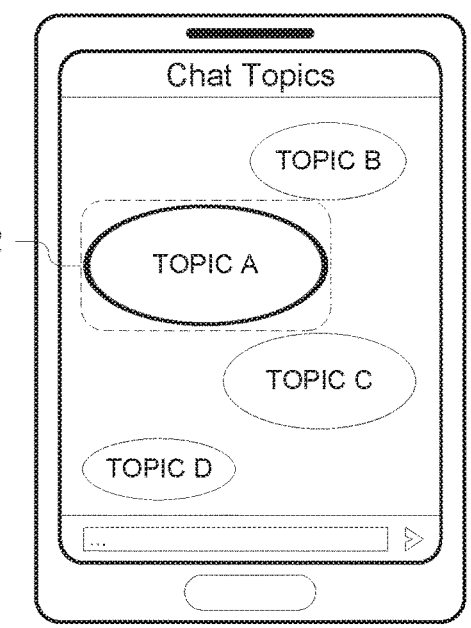
FIG. 3H illustrates an example display of a notification of new messages while in the spatial view.

FIG. 3H illustrates an example display of a notification of new messages while in the spatial view. In some embodiments or scenarios, messaging programs 122a-n provide a change to the topic interface elements in topic list 318 when new messages associated with the topic are received. A message program displays highlight 362 to topic interface elements when a message is received related to the topic. By providing such an indication or notification to a user, a messaging program can quickly alert users to incoming messages related to certain topics that may be of interest to the user.

Figure 4:
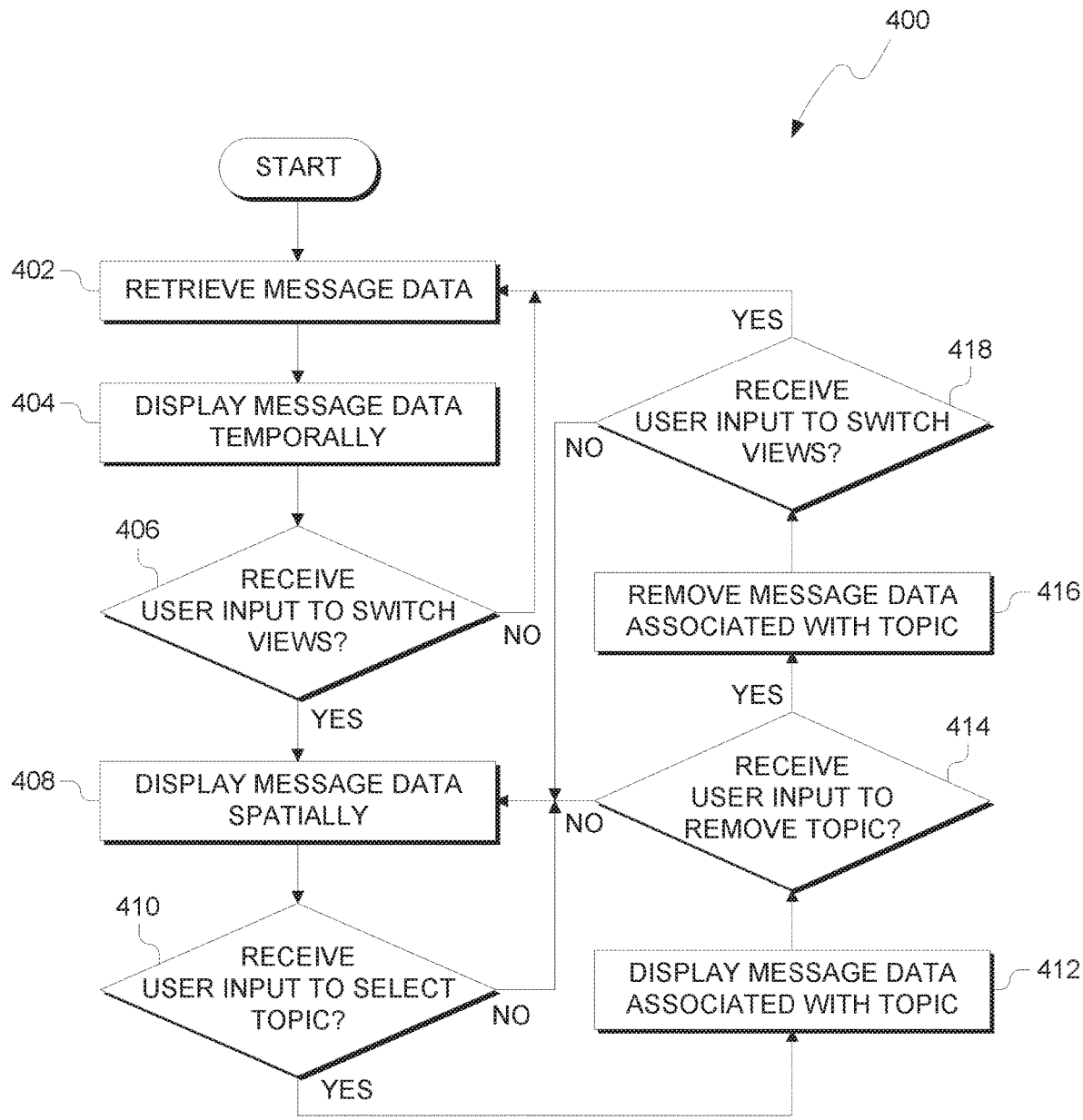
FIG. 4 illustrates operational processes of messaging program, on a computing device within the environment of FIG. 1, in accordance with an exemplary embodiment of the present invention.

FIG. 4 illustrates operational processes, generally designated 400 of a messaging program of messaging programs 122a-n. In process 402, the messaging program retrieves message data 116 associated with a user. The messaging program retrieves any messages that the user has sent, is a recipient of, or is a participant. In process 404, the messaging program displays the retrieved messages in a temporal or timeline manner similar to message log 314 in FIG. 3A. In decision process 406, the messaging program identifies if any user input has been received regarding a switch to a spatial view. In some embodiments and scenarios, the user input is a gesture or type of touch input of a touch enabled display, such as interaction 322 in FIG. 3C. In other embodiments and scenarios, the messaging program provides a user interface element to switch views. If no user input is received (NO branch of decision process 406), then the messaging program checks for new messages (process 402) and remains in the temporal view (process 404). If user input is received (YES branch of decision process 406), then the messaging program displays a spatial view (process 408), such as topic list 318 in FIG. 3B.

In decision process 410, the messaging program identifies if the user has provided any input to select a topic. If no user input is received (NO branch of decision process 410), then the messaging program remains in the spatial view (process 408). If user input is received (YES branch of decision process 410), then the messaging program displays messages associated with the selected topic (process 412), such as topic popup 324 of FIG. 3D or topic log 344 of FIG. 3F. In decision process 410, the messaging program identifies if the user has provided any input to remove a topic. If no user input is received (NO branch of decision process 414), then the messaging program remains in the spatial view (process 408). If user input is received (YES branch of decision process 414), then the messaging program removes messages associated with the topic from messages data 116. In some embodiments, the messages are dismissed from viewing, but are retained in message data 116. In decision process 418, the messaging program the messaging program identifies if any user input has been received regarding a switch back to the temporal view. In some embodiments and scenarios, the same input or interface discussed in decision process 406 is used to indicate a switch back to temporal view. For example, the same gesture or touch input (e.g., interaction 322) may be provided or the interface element to switch views is engaged. If no user input is received (NO branch of decision process 418), then the messaging program remains in the spatial view (process 404). If user input is received (YES branch of decision process 418), then the messaging program checks for new messages (process 402) and switches to the temporal view (process 404), such as message log 314 in FIG. 3A. In some embodiments, the messaging program continually checks for new messages (process 402) during the execution of the above processes.

In various embodiments, the messaging program polls for input from a user regarding decision processes 410, 414, and 418. While in a spatial view, a user may at any time switch back to a temporal view of messages data (process 404), select a topic and view message data 116 related to the selected topic (process 410), or dismiss or remove message data related to a topic (process 414). The processes discussed herein may be performed in any order or sequence. Additionally, more than one process may be performed in parallel.

Figure 5:
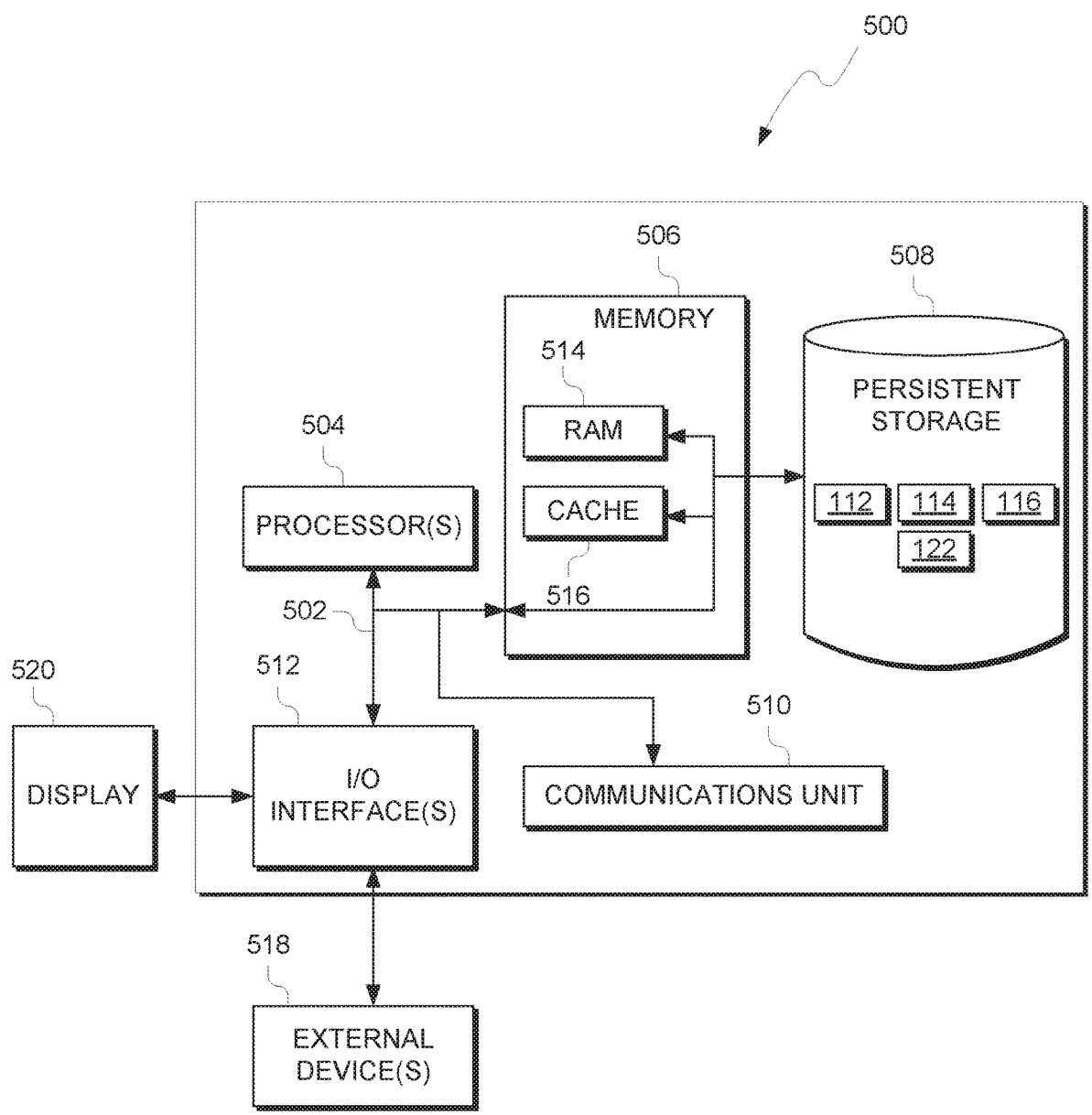
FIG. 5 depicts a block diagram of components for a computing device executing messaging coordinator program or messaging program, in accordance with an exemplary embodiment of the present invention.

FIG. 5 depicts a block diagram of components of computing device 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Messaging coordinator program 112, user data 114 and message data 116, and messaging programs 122a-n are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. Messaging coordinator program 112, user data 114 and message data 116, and messaging programs 122a-n may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., messaging coordinator program 112, user data 114 and message data 116, and messaging programs 122a-n, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   retrieving, by one or more processors, message data associated with a user;
   determining, by the one or more processors, one or more topics represented by the message data;
   determining, by the one or more processors, one or more relevance scores corresponding to the user regarding the one or more topics;
   displaying, by the one or more processors, a temporal visualization of the message data;
   identifying, by the one or more processors, touch input gesture to initiate display of a spatial visualization of one or more user interface elements corresponding to the one or more topics;
   identifying, by the one or more processors, a location of the touch input gesture;
   generating, by the one or more processors, the spatial visualization including a respective size and a respective location for the one or more user interface elements, wherein (i) the one or more user interface elements are rendered at one or more distances from the location of the touch input gesture and (ii) the one or more distances from the location of the touch input gesture being proportional to the relevance scores of the one or more user interface elements; and
   responsive to identifying the touch input gesture to initiate display of the spatial visualization, displaying, by the one or more processors, the spatial visualization of the one or more user interface elements corresponding to the one or more topics, wherein the spatial visualization is not displayed prior to identifying the touch input gesture.

2. The method of claim 1, the method further comprising:
   identifying, by the one or more processors, a user interaction with a topic of the one or more displayed topics; and
   displaying, by the one or more processors, one or more messages of the message data corresponding to the topic.

3. The method of claim 1, the method further comprising:
   identifying, by the one or more processors, a user interaction with a topic of the one or more displayed topics; and
   removing, by the one or more processors, one or more messages of the message data corresponding to the topic.

4. The method of claim 1, wherein determining the one or more relevance scores corresponding to the user is based, at least in part, on one or more of the following: (i) one or more preferences of the user; (ii) a participation level of the one or more topics; and (iii) a collaboration score between the user and participants of the one or more topics.

* * * * *